US012675891B2

(12) United States Patent
    Yuan

(10) Patent No.: US 12,675,891 B2
(45) Date of Patent: Jul. 7, 2026

(54) METHOD AND DEVICE FOR ANONYMIZING REIDENTIFICATION DATA IN A VISUAL TRACKING SYSTEM

(71) Applicant: Axis AB, Lund (SE)

(72) Inventor: Song Yuan, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 18/978,214

(22) Filed: Dec. 12, 2024

(65) Prior Publication Data

US 2025/0200765 A1     Jun. 19, 2025

(30) Foreign Application Priority Data

Dec. 19, 2023     (EP) ..................................... 23218043

(51) Int. Cl.
    *G06K 9/00*          (2022.01)
    *G06F 21/16*         (2013.01)
    (Continued)

(52) U.S. Cl.
    CPC .............. *G06T 7/292* (2017.01); *G06F 21/16* (2013.01); *G06T 7/246* (2017.01)

(58) Field of Classification Search
    CPC ..................... G06T 7/292; G06T 7/246; G06T 2207/10016; G06T 7/223;
    (Continued)

(56) References Cited

U.S. PATENT DOCUMENTS 9,977,991 B2     5/2018     Chu et al.
10,181,090 B2    1/2019     Chu et al.
                    (Continued)

FOREIGN PATENT DOCUMENTS

CN     108446680 B     12/2021
CN     114463863 A     5/2022
                    (Continued)

OTHER PUBLICATIONS

Dietlmeier et al., "Improving Person Re-Identification with Temporal Constraints," 2022 IEEE/CVF Winter Conference on Applications of Computer Vision Workshops, Waikoloa, HI, USA, pp. 540-549 (2022).

(Continued)

*Primary Examiner* — Atiba O Fitzpatrick
(74) *Attorney, Agent, or Firm* — Volpe Koenig

(57) ABSTRACT

A method of providing anonymized data for facilitating reidentification in a visual tracking system, the method comprising: detecting, in images obtained from a plurality of image sources, subareas which each contain a tracking target; computing, for each subarea, a feature vector which represents a visual appearance of the tracking target therein; for a first/second subgroup of the image sources, providing first/second reidentification data items by anonymizing each feature vector using a predefined one-way function modified by a first/second tracking-rights token, and disclosing the first/second reidentification data items annotated with locations of the respective subareas to a first/second tracking client, wherein the second tracking-rights token is distinct from the first tracking-rights token; and preventing access to the feature vectors.

16 Claims, 5 Drawing Sheets

(51) Int. Cl.
  *G06T 7/246* (2017.01)
  *G06T 7/292* (2017.01)

(58) Field of Classification Search
  CPC . G06T 2207/10004; G06T 2207/20104; G06T
       7/70; G06T 7/73; G06T 7/74; G06T
       2207/30241; G06T 2207/30252; G06T
       2207/30256; G06T 2207/30261; G06F
       21/16; G06F 21/6254; G06F 3/013; G06F
       21/602; G06F 21/604; G06F 21/10; G06V
       20/52; G06V 10/25; G06V 10/75; G06V
       20/70; G06V 20/50–588; G06V 20/48;
       G06V 40/103; H04N 7/181
  See application file for complete search history.

(56) References Cited

U.S. PATENT DOCUMENTS

| | | | | |
|---|---|---|---|---|
| 10,896,345 | B2 | 1/2021 | Mandal et al. | |
| 10,943,287 | B1* | 3/2021 | Vakacharla | G06Q 30/0641 |
| 11,113,587 | B2* | 9/2021 | Butt | G06N 3/084 |
| 2014/0184803 | A1* | 7/2014 | Chu | G06T 7/292 |
| | | | | 348/159 |
| 2016/0342812 | A1* | 11/2016 | Lynch | H04L 63/0421 |
| 2019/0043351 | A1* | 2/2019 | Yang | G06V 10/764 |
| 2021/0124941 | A1* | 4/2021 | Mirza | G06V 20/52 |
| 2021/0124946 | A1* | 4/2021 | Mirza | G06T 7/292 |
| 2021/0125350 | A1* | 4/2021 | Chinnam | G06T 7/248 |
| 2021/0125356 | A1* | 4/2021 | Wang | G06Q 20/203 |
| 2021/0201510 | A1* | 7/2021 | Crain | G06Q 30/0201 |
| 2022/0092342 | A1* | 3/2022 | Jakobsen | G06F 16/787 |
| 2022/0309186 | A1* | 9/2022 | Kåberg Johard | H04L 9/3231 |
| 2024/0193497 | A1* | 6/2024 | Morales Saiki | G06V 40/178 |
| 2024/0212027 | A1* | 6/2024 | Woollard | G06V 20/52 |
| 2024/0403388 | A1* | 12/2024 | Jakobsen | G06V 10/75 |

FOREIGN PATENT DOCUMENTS

| | | |
|---|---|---|
| CN | 115941273 A | 4/2023 |
| EP | 3971734 A1 | 3/2022 |
| EP | 4116942 A1 | 1/2023 |
| WO | 2021213797 A1 | 10/2021 |

OTHER PUBLICATIONS

Weiss et al., "Spectral Hashing" in Koller et al., Advances in Neural Information Processing Systems 21 (NIPS 2008) ISBN 9781605609492.
Ye et al., "Deep Learning for Person Re-Identification: A Survey and Outlook," IEEE Transactions on Pattern Analysis and Machine Intelligence, arXiv preprint, arXiv:2001.04293 (2021).
Zahra et al., "Person Re-identification: A Retrospective on Domain Specific Open Challenges and Future Trends," Pattern Recognition, vol. 142 (2023).
Zheng et al., "Person Re-Identification: Past, Present and Future," arXiv preprint, arXiv:1610.02984 (2016).
Extended European Search Report, European Patent Application No. 23218043.0 mailed Jun. 6, 2024.

* cited by examiner

*200*

*Detect subareas* —210

*Compute feature vectors* —211

*Provide 1ˢᵗ reID vectors* —212.1

*Provide 2ⁿᵈ reID vectors* —212.2

*Disclose w locations to 1ˢᵗ tracking client* —213.1

*Disclose w locations to 2ⁿᵈ tracking client* —213.2

*Protect feature vectors* —214

215a— Negotiate expiry ⦙ Receive expiry indication —215b

Stop using token —216

*300*

METHOD AND DEVICE FOR ANONYMIZING REIDENTIFICATION DATA IN A VISUAL TRACKING SYSTEM

TECHNICAL FIELD

The present disclosure relates to the field of visual tracking systems. In particular, it proposes a novel method and device for anonymizing reidentification data in a visual tracking system, as well as a novel method and device for performing visual tracking using anonymized reidentification data.

BACKGROUND

Recent technological development in the field of object reidentification have made available more robust ways of visually tracking a target, such as a person or object, within the field-of-view (FOV) of one camera or across the FOVs of several cameras. This is highly useful in applications like object search and loitering detection. According to an established and widely practiced paradigm, the visual tracking is not performed on image data directly but on so-called reidentification data (reID data). As reID data, it is customary to use feature vectors that each represent a visual appearance of a tracking target. A feature vector may be described as a low-dimensional representation of the image data, which on the one hand economizes the data volume to be handled and on the other hand allows accurate matching.

The visual tracking may be performed by a tracking client which is separate from the camera that acquired the original image data. In this case, the image data has to be transferred from the camera to the tracking client over a data connection, which raises concerns of unwanted dissemination of personal data, e.g., by eavesdropping. Transfer of image data is usually unavoidable if visual tracking is to be performed across the FOVs of several cameras. The concerns of dissemination are equally justified if the camera supplies the tracking client with reID data instead of image data, as the reID data may enable unauthorized tracking of a previously identified target.

In view of these concerns, it would be desirable to preprocess or modify the reidentification data at the source such that the scope of the visual tracking is delimited with respect to space and/or time. To mention one example of spatial delimitation, a system owner may want to specify that the reidentification data from one image source is only to be used for visual tracking within the FOV of that image source.

In another example, the system owner may consent to using this re-identification data in combination with reidentification data from a second image source but disallow its use together with reidentification data from a third image source; in other words, the permitted use of the reidentification data is across the FOVs of the first and second image sources. In the event an unauthorized party (eavesdropper) gains access to the reidentification data, a technical mechanism should cause his tracking attempts to fail.

SUMMARY

One objective of the present disclosure is to make available methods and devices for delimiting the scope of visual tracking with respect to space and/or time. (Here, a scope is said to be delimited with respect to space if it is limited to a number of specified image sources, even if the spatial locations of the image sources are not known.) A further objective is to make available such methods and devices that anonymize the data on which the visual tracking is based. A further objective is to make available methods and devices for providing reidentification data which supports reidentification only in the FOVs of specific groups of image sources. A further objective is to make available such methods and devices that protect anonymity. A still further objective is to propose methods and devices for performing visual tracking using anonymized data.

At least some of these objectives are achieved by the invention as defined by the independent claims. The dependent claims relate to advantageous embodiments of the invention.

In a first aspect of the present disclosure, there is provided a visual tracking system having as its main components a plurality of image sources, an anonymization layer, and a plurality of tracking clients.

The image sources are configured to provide images within their respective FOVs, wherein each image source is configured to detect, in images obtained from the image sources, subareas $m_i$ which each contain a tracking target, and to compute—for each subarea—a feature vector $f(m_i)$ which represents a visual appearance of the tracking target therein. Further, the anonymization layer is implemented in processing circuitry separate from the tracking clients, such as in processing circuitry which is co-located with respective ones of the image sources and/or in processing circuitry belonging to a coordinating entity in the visual tracking system. The anonymization layer is configured to provide first reidentification data items $g_{i,1}=h([f(m_i), \sigma_1])$ by anonymizing each feature vector using a predefined one-way function h which is modified by a first tracking-rights token $\sigma_1$. The first tracking-rights token $\sigma_1$ is specific to a first group of image sources. The anonymization layer is further configured to provide second reidentification data items $g_{i,2}=h([f(m_i), \sigma_2])$ by anonymizing each feature vector using the predefined one-way function h, which is now modified by a second tracking-rights token $\sigma_2$. The second tracking-rights token $\sigma_2$ is specific to a second group of image sources and is distinct from the first tracking-rights token, $\sigma_2\neq\sigma_1$. The anonymization layer is further configured to disclose the first and second reidentification data items annotated with locations $X(m_i)$ of the respective subareas $m_i$ to the tracking clients, while preventing access to the feature vectors. The first group of image sources contains at least one of the image sources. The second group of image sources contains at least one of the image sources. Finally, the tracking clients are configured to perform reidentification of tracking targets using data obtained from the anonymization layer. Among the tracking clients, there is at least: a first tracking client, which is authorized to perform reidentification in FOVs of the first group of image sources and to acquire the location-annotated first reidentification data items, and a second tracking client, which is authorized to perform reidentification in FOVs of the second group of image sources and to acquire the location-annotated second reidentification data items. The tracking clients may acquire the reidentification data items by receiving them over an internal or external data connection, or by retrieving them from a shared memory.

Advantageously, because the anonymization layer prevents access to the feature vectors (and the anonymization layer is separate from the tracking clients), and because the first and second reidentification data items are generated by means of distinct tracking-rights tokens $\sigma_1$, $\sigma_2$ which are specific to respective first/second groups of image sources, each tracking client is restricted to performing reidentification in the FOVs of its respective group of image sources. If hypothetically the first tracking client attempted to perform reidentification in a set containing both the first and second reidentification data items, then the first tracking client would never find a match between one of the first reidentification data items and one of the second reidentification data items. Thanks to the one-way function's property of being collisionless, even if the function h is applied to the same feature vector $f(m_0)$, the distinctness of the tracking-rights tokens $\sigma_1 \neq \sigma_2$ will ensure that $$g_{0,1} = h([f(m_0), \sigma_1]) \neq h([f(m_0), \sigma_2]) = g_{0,2}. \quad (1)$$

It is thus technically pointless for the first tracking client to try and exceed the first group of image sources. With generic reidentification data—e.g., assuming instead that the original feature vectors had been used as reidentification data—there is no inherent mechanism that stops the first tracking client from performing reidentification outside the FOVs of the first group of image sources.

Again due to the one-way property of the function h, the feature vectors $f(m_i)$ are anonymized. A party downstream of the anonymization layer cannot reconstruct the feature vectors $f(m_i)$ from one of the reidentification data items $g_{i,1}$, $g_{i,2}$. Even with complete access to a large set of reidentification data, it is a computationally infeasible task to invert the function h.

In a second aspect of the present disclosure, there is provided a method of providing anonymized data for facilitating reidentification in a visual tracking system. The method comprises: detecting, in images obtained from a plurality of image sources, subareas $m_i$ which each contain a tracking target; computing, for each subarea, a feature vector $f(m_i)$ which represents a visual appearance of the tracking target therein. For a first subgroup of the image sources, first reidentification data items $g_{i,1} = h([f(m_i), \sigma_1])$ are provided by anonymizing each feature vector using a predefined one-way function h modified by a first tracking-rights token $\sigma_1$; and the first reidentification data items annotated with locations $X(m_i)$ of the respective subareas are disclosed to a first tracking client. For a second subgroup of the image sources, second reidentification data items $g_{i,2} = h([f(m_i), \sigma_2])$ are provided by anonymizing each feature vector using the predefined one-way function h, which is now modified by a second first tracking-rights token $\sigma_2$ which is distinct from the first tracking-rights token; and the second reidentification data items annotated with locations $X(m_i)$ of the respective subareas are disclosed to a second tracking client. The method further comprises preventing access to the feature vectors.

The method according to the second aspect facilitates (i.e., assists, supports, enables) reidentification to be performed in a visual tracking system in that it supplies the reidentification data items among which the tracking clients will search for matches, for thereby following a tracking target. As explained above, the proposed way of generating the reidentification data items also ensures anonymity. Further, thanks to the distinctness of the tracking-rights tokens, the reidentification data items are generated in a way that delimits the scope of visual tracking to specified subgroups of image sources. It is possible to execute multiple instances of the method according to the second aspect such that the first tracking-rights token $\sigma_1$ is specific not only to the first subgroup of image sources but to a first group of image sources that includes the first subgroup and/or such that the second tracking-rights token $\sigma_2$ is specific not only to the second subgroup of image sources but to a second group of image sources that includes the second subgroup. For example, the first group of image sources may consist of the first subgroup and one further subgroup for which an independent process generates reidentification data items using an identical first tracking-rights token $\sigma_1$.

Some steps of method of the second aspect can be performed in the anonymization layer, and some steps can possibly be performed in the image sources as well. In implementations of the method, it is possible to delegate the steps of detecting subareas $m_i$ and computing a feature vector $f(m_i)$ for each subarea to the image sources. Accordingly, the anonymization layer need not perform more than the following steps:

For a first subgroup of the image sources, first reidentification data items are provided by anonymizing each feature vector using a predefined one-way function h modified by a first tracking-rights token; and the first reidentification data items annotated with locations of the respective subareas are disclosed to a first tracking client.

For a second subgroup of the image sources, second reidentification data items are provided by anonymizing each feature vector using the function h modified by a second tracking-rights token; and the second reidentification data items annotated with locations of the respective subareas are disclosed to a second tracking client.

The access to the feature vectors is prevented.

It is understood that the anonymization layer may have initially obtained feature vectors which have been computed for subareas in images from a plurality of image sources, wherein each subarea contains a tracking target and the feature vector represents a visual appearance of the tracking target therein.

According to a third aspect of the present disclosure, there is provided a method for performing visual tracking of tracking targets in fields-of-view of a first group of image sources. The method comprises: receiving first reidentification data items $g_{i,1}$; searching for matching reidentification data items among the first reidentification data items; and for a set of mutually matching reidentification data items, following one tracking target on the basis of the locations with which the mutually matching reidentification data items are annotated. According to the third aspect, each first reidentification data item has been derived from a feature vector $f(m_i)$ which represents a visual appearance of a tracking target in a subarea of an image obtained from an image source in the first group, and each first reidentification data item is annotated with a location of the respective subarea. Further, all the first reidentification data items have been computed using a predefined one-way function h modified by a first tracking-rights token $\sigma_1$ which is specific to the first group of image sources.

The method according to the third aspect makes visual tracking possible despite the reidentification data being provided in the form of anonymized data. In particular, the method may include searching for matching reidentification data items among a set of reidentification data items that have been computed using a single predefined one-way function h modified by a single tracking-rights token $\sigma_1$. (As explained above, the input to this computation is feature vectors which each represent a visual appearance of a detected tracking target.) This is to say, the method excludes searching for matching reidentification data items among reidentification data items that have been computed using different one-way functions and/or searching for matching reidentification data items among reidentification data items that have been computed using a one-way function that has been modified by two or more different tracking-rights tokens.

In fourth and fifth aspects of the present disclosure, there are provided devices or device clusters which comprise processing circuitry that is configured to perform the method according to the second aspect (providing anonymized data for facilitating reidentification) or the method according to the third aspect (performing visual tracking).

The present disclosure further proposes a computer program containing instructions for causing a computer to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Some embodiments delimit the scope of visual tracking with respect to time as well, namely, by ceasing to use (in the anonymization layer) the first tracking-rights token $\sigma_1$ after a validity period of the first tracking-rights token has expired. The anonymization layer may henceforth anonymize the feature vectors using the predefined one-way function h modified by a substitute first tracking-rights token $\sigma_1'$. Thus, because of the one-way function provides non-colliding output values, the first tracking client will never find a match between reidentification data items generated before and after the token substitution, not even for the same feature vector (i.e., $h([f(m_0), \sigma_1]) \neq h([f(m_0), \sigma_1'])$ analogously to (1)).

To delimit the scope of visual tracking with respect to time only, the same tracking-rights token is used to modify the one-way function h for all image sources in the visual tracking system. When a validity period of the tracking-rights token expires, the one-way function h is instead modified—still for all image sources in the visual tracking system—by a substitute tracking-rights token. This allows the tracking clients to perform reidentification in FOVs of all image sources in the visual tracking system but inside one validity period at a time.

For the purposes of the present disclosure, the term "reidentification data" (or reID data) refers to the quantity or variable which forms the basis of the reidentification process, the matching process where image data from different times and locations are identified as referring to the same tracking target, such as a person or an object. The reID data may be a proxy for the actual image data, such as feature vectors derived from the image data. In individualized form, the feature vectors may be referred to as reID data items. The reID data may be provided in the form of non-anonymized data (e.g., feature vectors) or as anonymized data (e.g., hashes of feature vectors). According to the first, second and further aspects of this disclosure, the reID data shall be provided as anonymized data. Hashing and other types of anonymization process may bring with them a change in data type; for example, a hash of a vector may be a scalar, although special hashing techniques exist that return a vector.

As used herein, a "location" $X(m_i)$ of a subarea $m_i$ can refer to the subarea's position in an image or to a geoposition. The geoposition may correspond to the position of the image source which acquired the image, which is independent of the subarea's position in the image. Further, the geoposition may be an approximate position of the portion of the image source's FOV that the subarea $m_i$ depicts.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless this is explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

System Overview

Figure 1A:
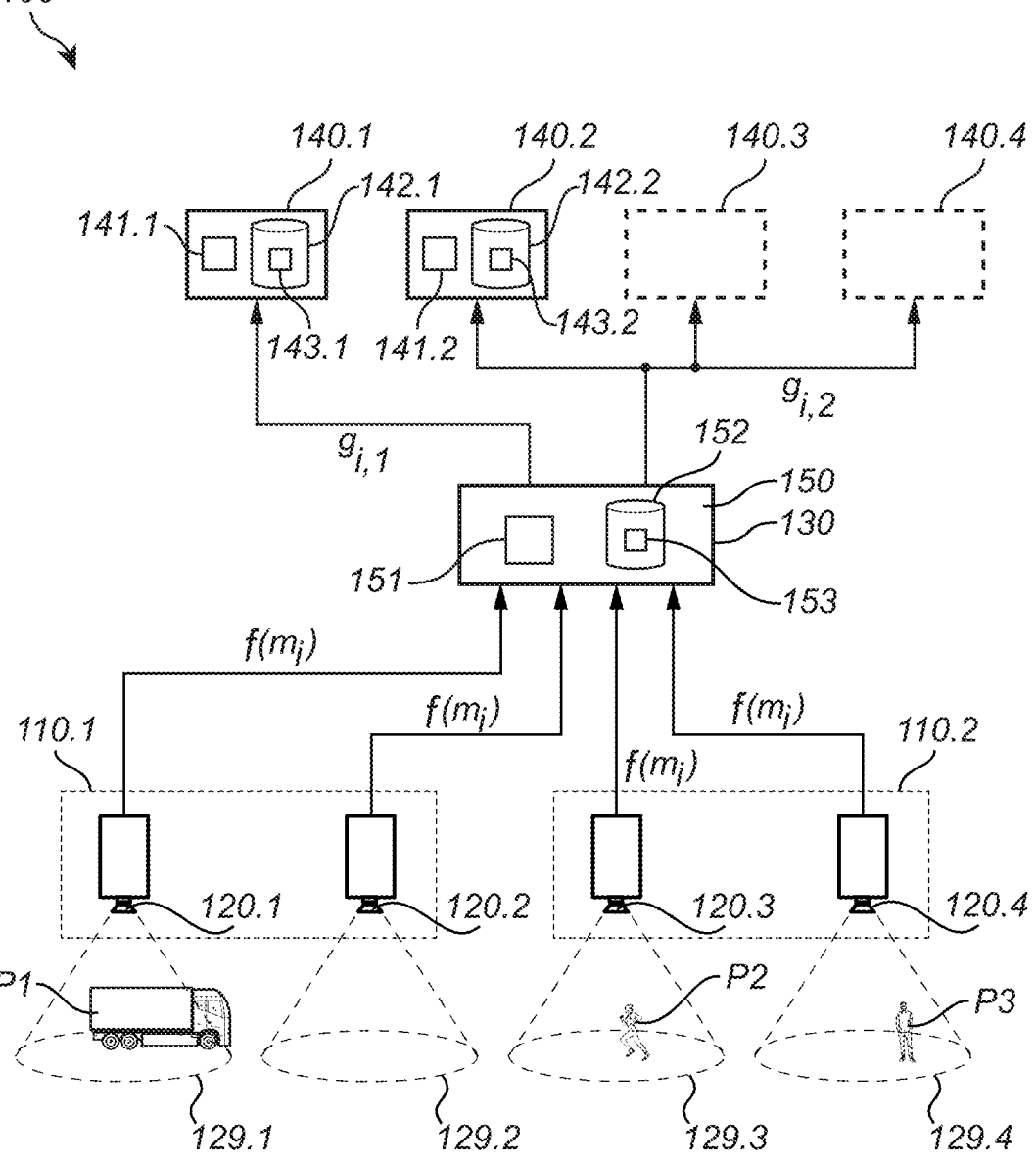
FIGS. 1A and 1B shows two visual tracking systems.

FIG. 1A shows a visual tracking system 100 suitable for performing visual tracking of tracking targets P1, P2, P3. The tracking targets P1, P2, P3, which may be persons or inanimate objects, are exemplified in FIG. 1A as a vehicle P1 and two different persons P2, P3. Conceptually, the technology of visual tracking may be said to rest on an assumption that the tracking targets are possible to recognize with high accuracy based on visual features that are unique or substantially unique within the scope of the visual tracking. In the case of a person, the unique visual features may include body height, posture, build, facial features and (a combination of) garments and shoes. In the case of a vehicle, the license plate may be a preferred choice. For each tracking target, a possible output of the visual tracking may be a list of the locations and indications of when the tracking target was present at these locations.

The visual tracking system 100 in FIG. 1A comprises four image sources 120.1, 120.2, 120.3, 120.4, which are arranged to provide images of respective FOVs 129.1, 129.2, 129.3, 129.4, and at least two tracking clients 140.1, 140.2. Each tracking client 140 comprises processing circuitry 141 and a memory 142, wherein the memory 142 is suitable for storing, among others, a computer program 143 which is executable by the processing circuitry 141, as well as input and output data of a reidentification process. The visual tracking system 100 further comprises an anonymization layer 130; the anonymization layer 130 is a virtual entity which is here implemented in a coordinating entity 150. The coordinating entity 150 may be a centralized hardware component or a centralized software process in the visual tracking system 100. The coordinating entity 150 may be implemented in a dedicated server or host computer in a computer network, or as a process executing on a computer or a virtual machine with additional responsibilities in the visual tracking system 100. The coordinating entity 150 runs on processing circuitry 151 and has a memory 152 at its disposal; the functioning of the coordinating entity 150 may be codified as a computer program 153.

The image sources 120, coordinating entity 150 and tracking clients 140 are linked by wired or wireless data connections, e.g., by being connected to a common data network. As will be explained below, the data connections from the image sources 120 to the coordinating entity 150 should preferably be protected from unauthorized parties as they convey feature vectors that have not yet undergone anonymization. (These data connections are sensitive also in such embodiments of the visual tracking system 100 where the feature vectors are computed in the coordinating entity 150, namely, since the data connections convey image data.) The data connections can be protected from eavesdropping and other attacks by unauthorized parties by means of adequate end-to-end encryption, tunneling, or by letting the data connections pass only through physically protected wired lines—such as a device-internal bus—which are sensibly safe from intrusion.

In the visual tracking system 100 of FIG. 1A, the novel techniques proposed herein are utilized to delimit the scope of the visual tracking spatially, and more precisely such that the first tracking client 140.1 shall be permitted to perform visual tracking in the FOVs of a first group 110.1 comprising the first image source 120.1 and the second image source 120.2, and such that the second tracking client 140.2 shall be permitted to perform visual tracking in the FOVs of a second group 110.2 comprising the third image source 120.3 and the fourth image source 120.4. For this purpose, the first tracking client 140.1 is supplied with location-annotated first reidentification data items $g_{1,1}$, $g_{2,1}$, $g_{3,1}$, . . . and the second tracking client 140.2 is supplied with location-annotated second reidentification data items $g_{1,2}$, $g_{2,2}$, $g_{3,2}$, . . . . The first group of image sources 110.1 and the second group of image sources 110.2 may be disjoint, or they may overlap at least partially.

Without departing from the scope of the present disclosure, it is possible to supply more than one tracking client with reidentification data originating from the same group of image sources. As suggested by the dashed boxes in the upper right corner of FIG. 1A, a third and fourth tracking client 140.3, 140.4 may perform reidentification in the FOVs of the second group 110.2 of image sources on the basis of the location-annotated second reidentification data items.

The functioning of the different components of the visual tracking system 100 will now be described in greater detail. The image sources 120.1, 120.2, 120.3, 120.4 comprise lenses, photosensitive components (image sensors) and image-processing components, by which they provide digital image data representing still images or video sequences of their respective FOVs 129.1, 129.2, 129.3, 129.4. The image sources 120 may for example be digital video cameras.

In the example shown in FIG. 1A, each image source 120 further comprises processing circuitry 121 configured to detect subareas $m_1$, $m_2$, . . . , $m_6$ in said images M such that each subarea contains a tracking target. The upper portion of FIG. 4 refers to an example where this detection process is applied to four images M; from what can be observed visually, subareas $m_1$, $m_4$, $m_6$ contain the same person at different locations (and consequently, at different points in time), subarea $m_5$ contains a different person, and subareas $m_2$, $m_3$ contain the same vehicle. The detection may be based on an object detection algorithm or an object classification algorithm, such as a body-part detection algorithm, face detection algorithm, or in the case of vehicles an algorithm configured to detect alphanumeric characters (e.g., on a license plate) or visual features of a vehicle. In different implementations, the algorithms can be configured to output bounding boxes, or otherwise separate bounding-box postprocessing may be performed downstream of the algorithm, whereby the subareas $m_1$, $m_2$, . . . , $m_6$ are obtained. As far as notation is concerned, each subarea $m_i$ preferably carries a globally unique index i. The index may be a single index from a sequence shared by all image sources. Alternatively, it may be a combination of multiple sub-indices (e.g., $i=(i_1, i_2, i_3)$), in which the respective sub-indices refer to a sequence of the image sources $(i_1)$, a sequence of the images captured by each image source $(i_2)$ and/or a sequence of the subareas within each image $(i_3)$.

The processing circuitry 121 of the image sources 120 in FIG. 1A is further configured to compute, for each of the subareas $m_1$, $m_2$, . . . , $m_6$, respective feature vectors (or appearance vectors) denoted $f(m_1)$, $f(m_2)$, . . . , $f(m_6)$, which represent a visual appearance of the tracking target or targets in these subareas $m_1$, $m_2$, . . . , $m_6$. The first feature vector may for example be a vector of numbers, e.g., $f(m_1)=(9,8,7,6,5,4,3,2,1,0)$, which have a known or unknown significance in feature space. A feature vector may alternatively be represented in the form of a string of characters, such as the following string of 43 characters in the base64 alphabet:

aAPjFcw7bOw74uD4GEVdpo5v0-
Sal1eoguVKYuwc1srRbb0OFhLOVOwUPA, which represents 128 bytes of 3 bits each. In the prior art, the feature vector together with a suitable distance metric is the basis for matching in the reidentification process, i.e., the assessment whether two feature vectors are sufficiently close with respect to the distance metric that they shall be treated as relating to the same tracking target. Various approaches to person reidentification within this framework are reviewed in the following references:

M. Ye et al., "Deep Learning for Person Re-identification: A Survey and Outlook", arXiv preprint, arXiv: 2001.04193 (2021);

Zahra et al., "Person re-identification: A retrospective on domain specific open challenges and future trends", *Pattern Recognition*, vol. 142 (2023), 109669, DOI: 10.1016/j.patcog.2023.109669; and L. Zheng et al., "Person re-identification: Past, present and future", arXiv preprint, arXiv: 1610.02984 (2016).

It will be explained below how these results can be used as a basis for reidentification in the specific visual tracking system 100 described herein.

In broad terms, a feature vector may be described as a low-dimensional representation of the visual appearance of the tracking target. The feature vector may for example be a license number represented as alphanumeric characters read from an image of a license plate of a vehicle (e.g., $f(m_1)=$'ABC123'). In this example, according to prior art reidentification technology, a match may require equality of all characters, or else the vehicles will not be recognized as identical.

In another example, the feature vectors are computed based on a transparent ('handcrafted', human-defined) definition, such as a color- or texture-based characteristic (e.g., weighted color histogram, maximally stable color regions, recurrent high-structured patches), or an attribute-based characteristic (e.g., garments, biometrics). Such a definition of the feature vector is independent of whether the target is provided with artificial labeling, which a license plate constitutes. The computation of the feature vectors may further take into account aspects that can be derived from video data, such as appearances from multiple viewing angles or movement patterns of the targets. The feature vectors may be low-dimensional in the sense that they comprise a small number of components and/or that each component takes values in a set with finite cardinality, e.g., by rounding real numbers to integers. In this case, according to prior art reidentification technology, a match of two feature vectors $x=(x_1, x_2, \ldots, x_N)$, $y=(y_1, y_2, \ldots, y_N)$ may correspond to complete equality of the vector components:

$$x_n = y_n, 1 \leq n \leq N, \tag{2}$$

or it may correspond to a separation of at most a threshold $D_0$ with respect to a distance metric $$d(x, y) < D_0. \tag{3}$$

The distance metric in (3) may for example correspond to $\ell^p$ distance:

$$d(x, y) = \sum_{n=1}^{N} |x_n - y_n|^p,$$

where p>0 is a predefined constant. The feature vectors may furthermore be compared with respect to a distance metric d(x,y) computed by a machine-learning model which has been trained to mimic correct or human-like reidentification decisions; then, a definition on closed form of the distance metric does not necessarily exist and is not needed.

In a third example, the feature vectors are computed by a machine-learning model, such as a convolutional neural network (CNN), which has been trained to mimic correct or human-like reidentification decisions. The training may include supervised or unsupervised learning. When the feature vectors are computed in this manner, the computations do not follow any transparent definition (which is anyhow not essential to the teachings herein) and their result normally cannot be interpreted unambiguously, e.g., in terms of aspects of the appearance of the tracking target. Further, the computations can only be repeated faithfully by the machine-learning model itself. Depending on how the machine-learning model has been trained, the feature vectors computed in this manner can either be compared with respect to a distance metric on closed form—like in equations (2) and (3)—or with respect to a distance metric computed by a machine-learning model.

Figure 4:
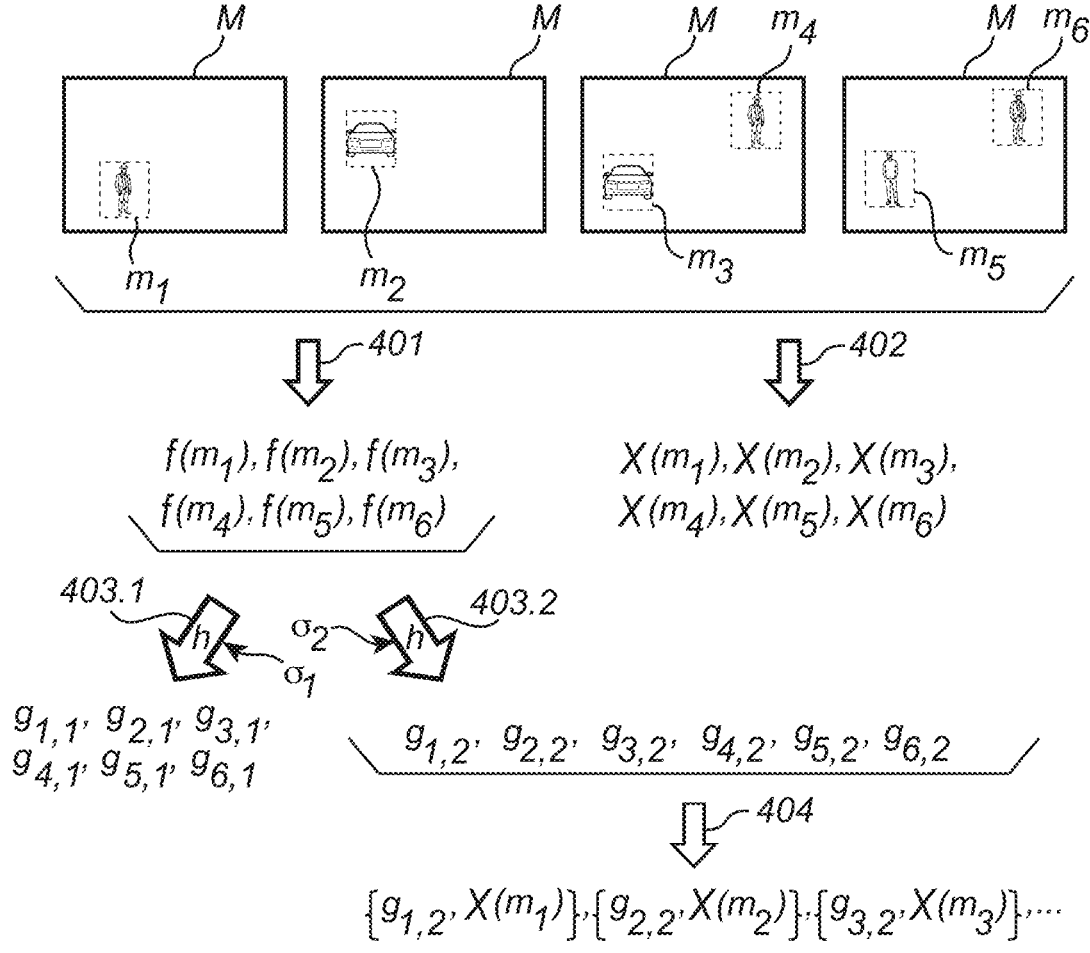
FIG. 4 illustrates the generating of anonymized reidentification data from acquired images.

In FIG. 4, reference number 401 denotes the process that provides the feature vectors $f(m_1)$, $f(m_2)$, ..., $f(m_6)$ on the basis of the images M. In the example visual tracking system 100 illustrated in FIG. 1A, an instance of this process 401 runs in the respective image source 120 that acquired the image M. In other embodiments, the process 401 may run in a coordinating entity 150 of the visual tracking system 100.

A further process 402 determines locations $X(m_1)$, $X(m_2)$, ..., $X(m_6)$ of the subareas $m_1$, $m_2$, ..., $m_6$. Each location can refer to the subarea's m; position in the image M (e.g., in pixel coordinates or expressed as percentages of the FOV dimensions) or it can be a geoposition (e.g., expressed in a global reference frame, such as WGS84). For definiteness, if the location is expressed in pixel coordinates, local geocoordinates or other local coordinates, the location should preferably contain a direct or indirect identifier of the image source. The geoposition may correspond to the (fixed) position of the image source 120 which acquired the image, which is independent of the subarea's position in the image. Further, the geoposition may be an approximate position of the portion of the image source's FOV that the subarea $m_i$ depicts. Thus, at least for some definitions of the location $X(m_i)$, it is possible to implement the process 402 in the image source 120 or in another component of the visual tracking system 100, such as in the coordinating entity 150, provided this other component has access to relevant information, such as the geopositions of the image sources 120, or geopositions of different portions of the FOV of an image source 120 which may have been estimated in advance. The locations $X(m_1)$, $X(m_2)$, ..., $X(m_6)$ are made available to the component(s) acting as the anonymization layer 130.

Anonymization Layer

Figure 2:
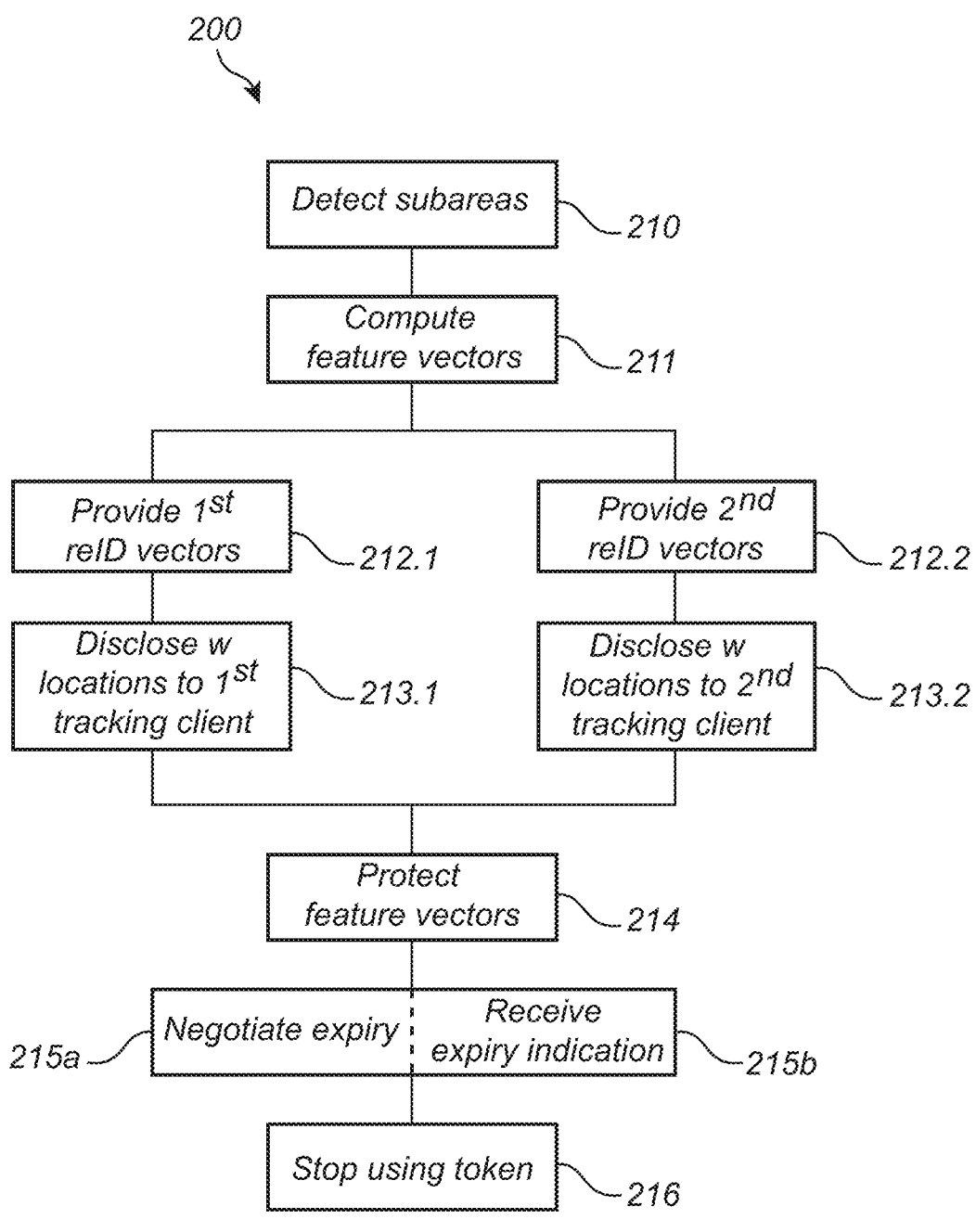
FIG. 2 is a flowchart of a method for providing anonymized data for facilitating reidentification in a visual tracking system.

The functioning of the anonymization layer 130 will now be described in terms of the method 200 illustrated by the flowchart in FIG. 2. The initial steps 210 and 211 correspond to processes 401 and 402 in FIG. 4. As mentioned, they can be performed either in the image sources 120 (or co-located therewith), in a coordinating entity 150, or even in a different component of the visual tracking system 100. The initial steps 210 and 211 can be performed in the anonymization layer 130 or upstream thereof. In some embodiments, thus, the anonymization layer 130 may be configured to perform just steps 212, 213 and 214. The architecture shown in FIG. 1A, where the anonymization layer is centralized in the coordinating entity 150 may avoid a need to hand out tracking-rights tokens to multiple parallel processes and/or it may simplify the replacement of a tracking-rights token when a validity period expires. It is understood that, when steps 210 and 211 are performed in the image sources 120 (or co-located therewith), they may correspond to multiple processes which execute in parallel; for example, there may be one process that detects subareas m; and computes feature vectors $f(m_i)$ for each image source.

Steps 212 and 213 are performed once for each subgroup 111 of image sources and may thus be repeated for two or more subgroups 111. For each execution of steps 212 and 213, a different tracking-rights token shall be used. In such embodiments where the anonymization layer 130 is not implemented in the processing circuitry 151 of the coordinating entity 150 but is distributed over multiple processors 121.1, 121.3, 121.4 (see FIG. 1B) which are co-located with respective ones of the image sources 120.1, 120.3, 120.4, it may occur that two instances of the method 200—which executes on two differences processors—use identical tracking-rights tokens $\sigma_1$ with respect to two different subgroups 111.1, 111.2 of image sources. In this setup, it may be considered that the tracking-rights token $\sigma_1$ is specific to a group of image sources 110.1 which is the union of the two subgroups 111.1, 111.2.

For a first subgroup 111.1 of image sources, step 212 includes providing 212.1 first reidentification data items by anonymizing each feature vector using a predefined one-way function h, wherein the one-way function h is modified by a first tracking-rights token $\sigma_1$, as follows:

$$g_{i,1} = h([f(m_i), \sigma_1]), i \in I_1, \qquad (4)$$

where $I_1$ is a first index set. The tracking-rights token $\sigma_1$ may be represented as a bitstring. The notation $[\cdot, \cdot]$ refers to a combining operation, such as string concatenation. The quantity (4) may have the appearance of a single number, a bitstring, an alphanumeric string, a vector or the like.

The one-way function is assumed to be noninvertible and sensibly collisionless. As a one-way function, a hash function can be used, particularly a cryptographic hash function that provides a safety level considered adequate in view of the sensitivity of the image data. Examples are SHA-256, SHA3-512, RSA-1024 and possibly MD5. When applied as shown in (4), the tracking-rights token may be considered to act as a cryptographic salt of the one-way function; conceptually, it defines a modified one-way function $H(x)=h([x, \sigma_1])$. Because of the non-invertibility of the one-way function h-even with knowledge of the tracking-rights token $\sigma_1$—it is not always necessary to treat the tracking-rights token $\sigma_1$ as a secret. Further, a recipient of the reidentification data items $g_{1,1}, g_{2,1}, g_{3,1}, \ldots$, such as a tracking client 140, can use the reidentification data items without knowing the value of the tracking-rights token $\sigma_1$.

As explained above, feature vectors are an example of reidentification data which can be used in reidentification processes. Several useful definitions of feature vectors are known in the art, and they can be categorized based on whether equality (2) shall be required for determining a match, or whether a nonzero separation less than a threshold $D_0$ shall be accepted as a match too, according to the condition (3). Also the reidentification data items $g_{i,1}$ are a type of reidentification data which can be used in reidentification processes substantially in line with state-of-the-art technology, that is, without a need for drastic adaptations on the recipient side.

If the underlying feature vectors are defined such that equality (2) shall be required, the recipient can use the reidentification data items $g_{1,1}, g_{2,1}, g_{3,1}, \ldots$ directly. This is because equality $g_{j,1}=g_{j'1}$ will imply that the underlying feature vectors are equal too, $f(m_j)=f(m_{j'})$, thanks to h being collisionless.

If instead the underlying feature vectors are defined such that a nonzero separation less than a threshold $D_0$ is accepted as a match (condition (3)), a proximity-preserving one-way function h (proximity-preserving hash function) should be used. The function h is proximity-preserving if, for all feature vectors x, y such that $d(x,y)<D_0$, it holds that $d(h(x), h(y))<D_0'$ where $D_0'$ is constant. Expressed without formulas, for any pair of feature vectors that are closer than a threshold $D_0$, there is a uniform bound Do on the distance of the anonymized feature vectors, i.e., the reidentification data items. Specifically, the proximity-preserving one-way function h shall be such that $d(h([x, \sigma]), h([y, \sigma]))<D_0'$ for some constant $D_0'$, where $\sigma$ is a tracking-rights identifier. (Possibly, the distance function has to be defined differently when applied to the reidentification data items, since they have a different format or datatype, but this is implicit here so as not to burden the notation unnecessarily.) The use of a proximity-preserving one-way function will allow a tracking client further downstream in the processing chain to search for matches based on a modified version of the proximity test (3), namely:

$$d(g_{j,1}, g_{j',1}) < D_0'. \qquad (3')$$

The proximity-preserving property can be achieved by dividing the feature vector into shorter sub-vectors (which have one or more components each) and hashing each sub-vector separately; in such embodiments, the reidentification data item comprises a number of sub-hashes (salted by the tracking-rights token) of the sub-vectors. If the feature vector is divided into sub-vectors with one component each, which are hashed individually, the resulting reidentification data item can be a vector of the same length as the feature vector. Further proximity-preserving hash functions are described in Y. Weiss et al., "Spectral Hashing", in: D. Koller et al. (eds.), *Advances in Neural Information Processing Systems* 21 (NIPS 2008), ISBN 9781605609492.

The reidentification data items $g_{1,1}, g_{2,1}, g_{3,1}, \ldots$ are annotated with the corresponding locations $X(m_1)$, $X(m_2)$, $X(m_3)$, . . . and they are disclosed, in step 213.1, to the tracking clients that are permitted to perform visual tracking in the FOVs of the first subgroup 111.1 of image sources. Disclosing the reidentification data items to the tracking clients may include sending them in a message to the tracking clients or storing them in a shared memory to which the tracking clients have access. The shared memory may be configured as a publication/subscription (Pub/Sub) messaging service. In the present example, the first tracking client 140.1 is permitted to perform visual tracking in the FOVs of the first subgroup 111.1 of image sources. Annotating a reidentification data item does not necessarily imply any modification of the reidentification data item itself; rather, the annotating may be achieved by storing the reidentification data item and its location in a common data structure (as FIG. 4 suggests), in associated fields of a table and/or by creating a pointer or another computer-readable association from the location to the reidentification data item or vice versa.

For a second subgroup 111.2 of image sources, step 212 includes providing 212.2 first reidentification data items by anonymizing each feature data item using the predefined one-way function h modified by a second tracking-rights token $\sigma_2$, as follows:

$$g_{i,2} = h([f(m_i), \sigma_2]), i \in I_2, \qquad (5)$$

where the index sets $I_1, I_2$ can be disjoint or have a nonzero overlap. These reidentification data items $g_{1,2}, g_{2,2}, g_{3,2}, \ldots$ are annotated with the corresponding locations $X(m_1)$, $X(m_2), X(m_3), \ldots$ and disclosed to those tracking clients that are permitted to perform visual tracking in the FOVs of the second subgroup 111.2 of image sources. In the present example, the second tracking client 140.2—and the optional third and fourth tracking clients 140.3, 140.4—are permitted to perform visual tracking in the FOVs of the second subgroup 111.2 of image sources.

In FIG. 4, the provision of the first and second reidentification data items corresponds to the processes 403.1 and 403.2, respectively. The annotating of the second reidentification data items with locations is illustrated as process 404. There is a corresponding process (not shown) of annotating the first reidentification data items with locations.

The method 200 further includes a step 214 of preventing access to the feature vectors. Measures are to be taken to stop any party to inspect or access the feature vectors, or to render such attempts very difficult. To prevent access to the feature vectors, as explained above, the feature vectors can be conveyed on data connections which are protected from eavesdropping and other attacks by unauthorized parties. Further, when the feature vectors are stored or cached, an adequately protected memory can be used. It noted that step 214 is limited, at least in some embodiments, to preventing access to those feature vectors that are under the control of the anonymization layer 130, e.g., which are stored in a memory of a component acting as anonymization layer. In such embodiments, it may be the responsibility of other components of the visual tracking system 100 to prevent access outside the scope of the control of the anonymization layer 130, say, to protect access to data connections upstream of the anonymization layer 130 on which the feature vectors are conveyed.

Tracking Clients

Figure 3:
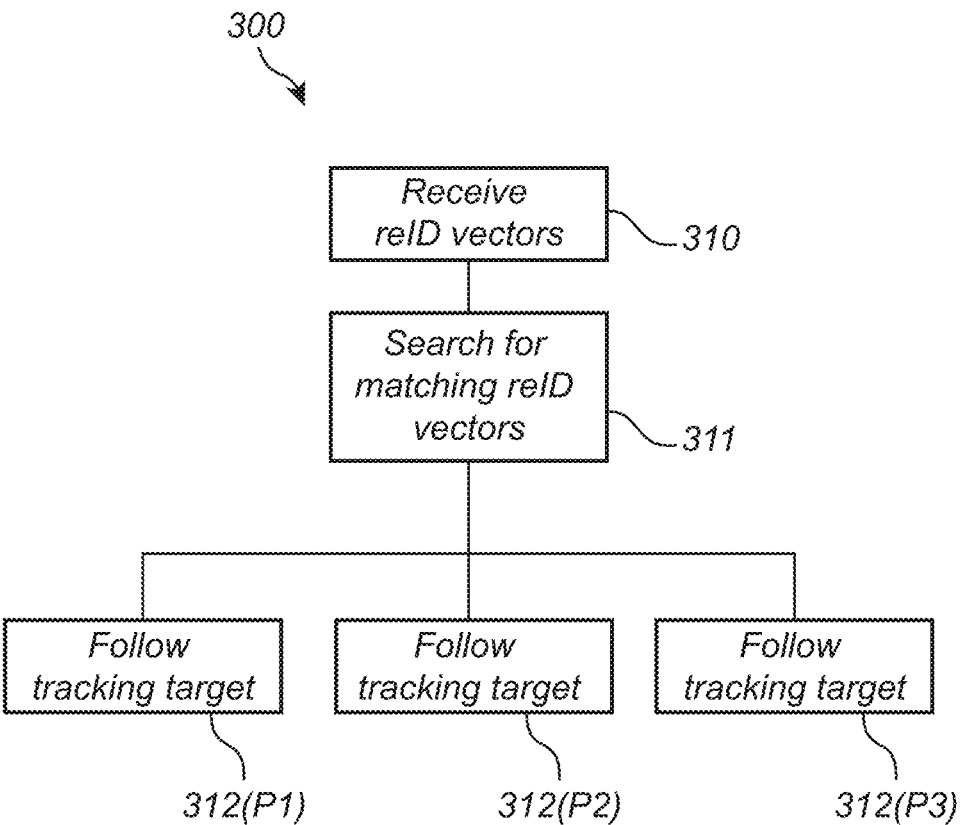
FIG. 3 is a flowchart of a method for performing visual tracking of tracking targets based on anonymized reidentification data.

Turning to FIG. 3, the behavior of an individual tracking client 140 will now be described in terms of the method 300. It is appreciated that the same operations may be performed in a general-purpose processor. The method 300 will be described from the point of view of a tracking client authorized to perform visual tracking of tracking targets in FOVs of a first group 110.1 of image sources, namely, those for which the first tracking-rights token $\sigma_1$ has been used to generate the reidentification data items. In the running example, this corresponds to the first tracking client 140.1.

In an initial step 310, the tracking client receives first reidentification data items $g_{i,1}$. This may include receiving the first reidentification data items $g_{i,1}$ in a message or fetching them from a shared memory. In fact, because the scope of the visual tracking is spatially delimited thanks to the non-matchability (1), it may be acceptable to make the first reidentification data items $g_{i,1}$ and any second reidentification data items $g_{i,2}$, third first reidentification data items etc. available in the same shared memory. Each said first reidentification data item has been derived from a feature vector $f(m_i)$ which represents a visual appearance of a tracking target in a subarea $m_i$ of an image obtained from an image source in the first group, and each first reidentification data item has been annotated with a location $X(m_i)$ of the respective subarea. As explained above, the first reidentification data items have more precisely been provided using the predefined one-way function h modified by the first tracking-rights token $\sigma_1$ specific to the first group of image sources. To execute the present method 300, it is not essential that the tracking client is able to confirm that the first reidentification data items have been provided in this particular manner; the fact that the reidentification data items are anonymized feature data items may not even be transparent to the tracking client.

The tracking client then proceeds to search, in step 311, for matching reidentification data items among the received first reidentification data items $g_{i,1}$.

If the underlying feature vectors $f(m_i)$ are discrete-valued or otherwise defined in such manner (e.g., projection on low-dimensional subspace, rounding to integer values) that they shall be considered to match only in the case of complete equality (2), then the reidentification data items too match if all their components are equal. This is to say, the tracking client searches for sets $G_{P1}$ of first reidentification data items such that all pairs of data items $g_{j,1}$, $g_{j',1} \in G_{P1}$ satisfy an equality condition, $g_{j,1} = g_{j',1}$. Because the one-way function h modified with the first tracking-rights token $\sigma_1$ is collisionless, the equality condition implies that the underlying feature vectors are equal as well, $f(m_j) = f(m_{j'})$. Each such set $G_{P1}$, $G_{P2}$, $G_{P3}$ can be considered to correspond to one tracking target P1, P2, P3.

If instead the underlying feature vectors are defined such that a nonzero separation less than a threshold $D_0$ is accepted as a match, according to the above criterion (3), and a proximity-preserving one-way function has been used, then the tracking client assesses whether the reidentification data items match by means of the test (3'). The set $G_{P1}$ may be populated iteratively in accordance with a rule such that a new reidentification data item $g_{k+1,1}$ shall be added to the set $G_{P1}$ if the set contains at least one reidentification data item $g_{j,1}$ such that $d(g_{j,1}, g_{k,1}) < D_0'$.

In step 312, for each of the sets $G_{P1}$, $G_{P2}$, $G_{P3}$ of mutually matching reidentification data items, the tracking client follows a corresponding tracking target P1, P2, P3 on the basis of the locations with which the mutually matching reidentification data items are annotated. The output of step 312 may have the format of a "track", a trajectory of the tracking target P1, P2, P3 from which the tracking target's location as a function of time can be understood, e.g., a table which maps points in time to locations or vice versa. Various graphical output formats of step 312 are possible as well.

This concludes the description of the basic functionalities of the visual tracking system 100 in accordance with a basic architecture. Some alternative embodiments will now be described.

Alternative Embodiments

Figure 1B:
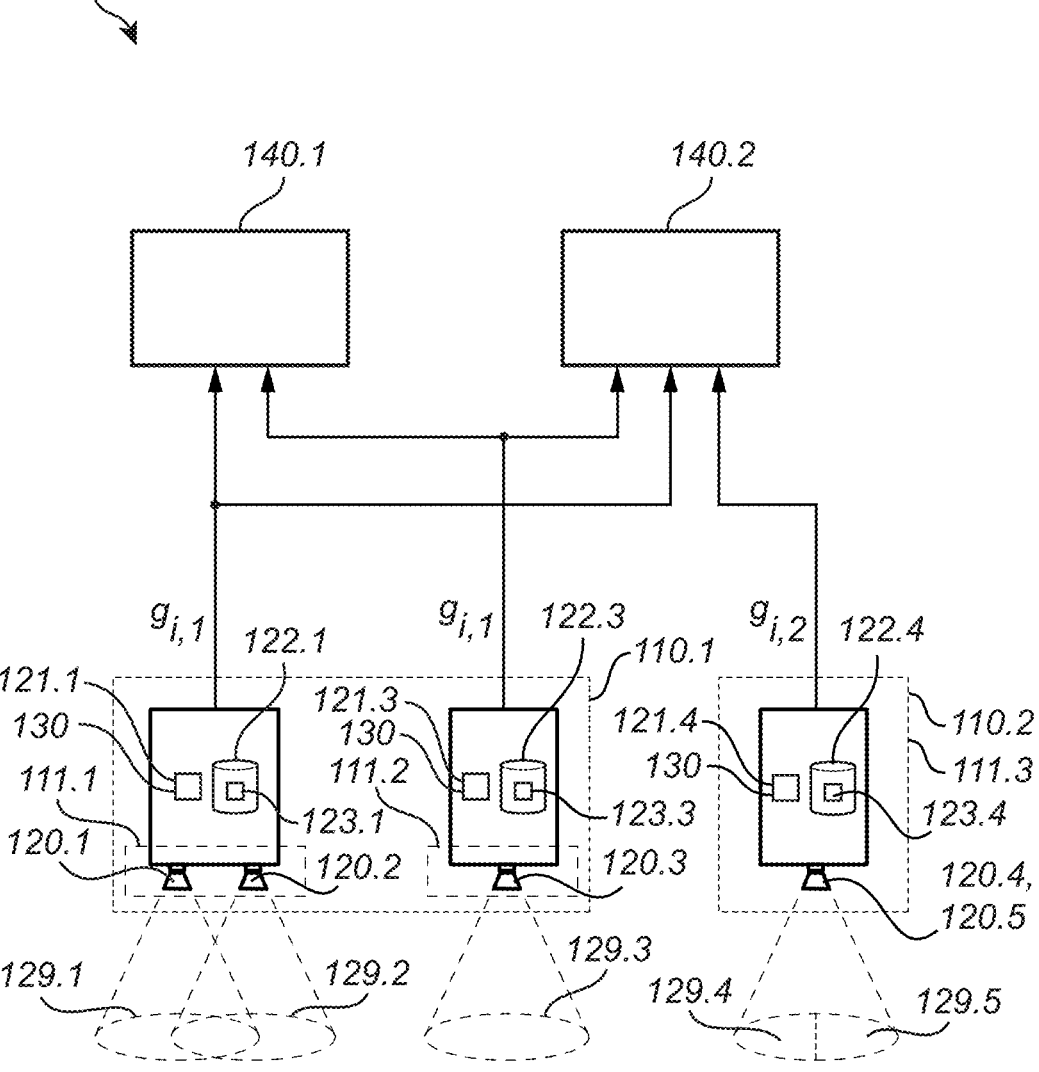

With respect to the architecture of the visual tracking system 100, FIG. 1B shows a structure which differs from that of FIG. 1A in the following respects.

The anonymization layer 130 is implemented in a distributed way. The processes which are proper to the anonymization layer 130 are performed in respective processing circuitry 121.1, 121.3, 121.4 which is co-located with the respective (physical) image sources. This corresponds to processes 403, 404 in FIG. 4 and to steps 212, 213, 214 in FIG. 2. An advantage of performing these processes in processing circuitry co-located with the image sources is that transfer of image data and/or feature vectors over an external and potentially unsafe data network can be avoided, which is in the interest of data security.

Also the processes that provide the feature vectors are performed in the processing circuitry 121.1, 121.3, 121.4 co-located with the image sources. This corresponds to processes 401, 402 in FIG. 4 and to steps 210, 211 in FIG. 2.

The reidentification data items from two (physical) image sources 120.1, 120.2 are provided, using a first tracking-rights token $\sigma_1$, in a common process executing on the processing circuitry 121.1. The image sources 120.1, 120.2 can be considered to constitute a subgroup 111.1. The FOVs of the image sources 120.1, 120.2 partially overlap.

A further process executing on the processing circuitry 121.3 provides reidentification data items from a further image source 120.3 using the first tracking-rights token $\sigma_1$. The first tracking-rights token $\sigma_1$ is thus specific to a group of image sources consisting of image sources 120.1, 120.2, 120.3 (and possibly more).

The two image sources 120.4, 120.5 correspond to different halves of the FOV of a single physical image source. The splitting of the FOV of the physical image source can be achieved by an optical arrangement or by digital image processing. The reidentification data items from these two (virtual) image sources 120.4, 120.5 are provided, using a second tracking-rights token $\sigma_2$, in a common process executing on the processing circuitry 121.4.

With respect to reidentification/tracking rights, the tracking clients 140 and image sources 120 can be in a one-to-one, a one-to-many, a many-to-one or a many-to-many relationship. Here, both tracking clients 140.1, 140.2 are authorized to perform reidentification in the FOVs of image sources 120.1, 120.2 and 120.3 and using the first reidentification data items $g_{i,1}$. The second tracking client 140.2 is additionally authorized to perform reidentification in the FOVs of the fourth and fifth image sources 120.4, 120.5 and using the second reidentification data items $g_{i,2}$.

The above visible differences between FIGS. 1A and 1B illustrate architectural variations which can be practiced when the teachings of the present disclosure are implemented. The variations can be practiced alone or in various combinations.

In some embodiments, the scope of visual tracking is delimited with respect to time, namely, by adding to the method 200 a step 216 where the anonymization layer 130 ceases to use the first tracking-rights token $\sigma_1$ after a validity period of the first tracking-rights token has expired. The anonymization layer 130 may henceforth anonymize the feature vectors using the predefined one-way function h modified by a substitute first tracking-rights token $\sigma_1'$, which is distinct from $\sigma_1$. As explained above, a first tracking client will be unable to find a match between reidentification data items generated before and after the token substitution, not even if it considers two reidentification data items that were generated based on the same feature vector.

The validity period of the first tracking-rights token $\sigma_1$ may be predetermined, such as every full hour or every full day. If not, the expiry time of the validity period can be determined dynamically. For this purpose, the inventor envisions two different but equivalent solutions which are suitable depending on whether the anonymization layer 130 is implemented using a centralized or distributed architecture.

In the case of a distributed implementation like the one shown in FIG. 1B, the method 200 includes a step 215a of negotiating between a first device 130.1 (e.g., processing circuitry 121.1) which performs one instance of the method 200 using the first tracking-rights token $\sigma_1$ and at least one further device 130.2 (e.g., processing circuitry 121.3) which perform respective further instances of the method 200 using the same first tracking-rights token $\sigma_1$. The negotiation step 215a may start with one device proposing an expiry time expressed in a common time base (network time), after which the further devices approve this proposal unanimously, or at least one of the further devices rejects it while making a counterproposal for the expiry time. The devices are configured to abide by an approved expiry time.

Whenever a coordinating entity 150 is available in the visual tracking system 100—that is, whether the implementation of the anonymized layer 130 is centralized or distributed—it is possible to determine the expiry of the validity period of the first tracking-rights token $\sigma_1$ by means of a decision taken by the coordinating entity 150. In a distributed implementation (FIG. 1B), the decision on the validity time is sent from the coordinating entity 150 to the various clusters of processing circuitry 121 co-located with the image sources 120 that function—together—as the anonymization layer 130 of the visual tracking system 100. The clusters of processing circuitry, which execute respective instances of method 200 and which receive the coordinating entity's 150 decision on the validity time (step 215b), are configured to behave consistently with the decided expiry time, i.e., stop using the tracking-rights token. In a centralized implementation (FIG. 1A), the coordinating entity 150 receives its decision internally, in the sense that it makes the decision and behaves accordingly when the expiry time is reached. For the avoidance of doubt, it is clarified that the coordinating entity 150 can be responsible for the decision-making concerning the expiry of the validity period even if the processes relating to the anonymization layer 130 are entrusted to other components of the visual tracking network 100.

The expiry of a tracking-rights token's validity period primarily affects the anonymization layer. However, it may as well be communicated to the tracking clients which use the reidentification data items generated by the anonymization layer, such that these tracking clients may restrict their searching (step 311 in method 300) for matching reidentification data items in time to the validity period of each tracking-rights token. This may avoid spending processing resources on pointless searching, knowing that the tracking client will never find a match between reidentification data items generated before and after a tracking-rights token substitution.

CLOSING REMARKS

To summarize, a visual tracking system has been proposed in which image sources perform object detection on captured images to determine a feature vector and location information (e.g., a bounding box) for each detected object or person (hereinafter: target). Each image source irreversibly anonymizes the determined feature vector together with a tracking-rights token to create an anonymized feature vector (reidentification data item). The image source then sends the reidentification data item together with the associated location information as metadata to a tracking client, which is authorized to perform target tracking in the relevant areas.

The proposed solution can be described as a method, performed in a visual tracking system (camera system) for tracking targets which are detected by the image sources therein. In broad terms, the following acts are performed.

Each image source is provided with a set of tracking-rights tokens. Each tracking-rights token is valid for a predetermined validity period, and it implements—on a technical level—the tracking client's different entitlements to track targets.

An image source, for each target that it detects, creates a metadata structure comprising an anonymized feature vector and location information for the detected target. Further, the anonymized feature vector is an anonymization of a combination of a feature vector for the detected target and a respective tracking-right token from said set. The anonymization of the combination of the feature vector and the respective right identifier of the set is ideally collision-resistant and irreversible.

For each image source and each detected target, the metadata structures are transmitted to a tracking client device which is authorized to track detected targets.

Each tracking client that is in receipt of two or more metadata structures compares the anonymized feature vectors of the different metadata structures. When it finds a match between the anonymized feature vectors, it adds the location information of the two received metadata structures to a track associated with the anonymized feature vectors (which may in turn be associated with a detected target).

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A visual tracking system comprising:
   a plurality of image sources configured to provide images M within respective fields-of-view, each image source configured to:
   detect, in images obtained from the image sources, subareas $m_i$ which each contain a tracking target; and
   compute, for each subarea, a feature vector $f(m_i)$ which represents a visual appearance of the tracking target therein;
   an anonymization layer configured to:
   provide first reidentification data items $g_{i,1}=h([f(m_i), \sigma_1])$ by anonymizing each feature vector using a predefined one-way function h modified by a first tracking-rights token $\sigma_1$, which first tracking-rights token is specific to a first group of at least one of the image sources;
   provide second reidentification data items $g_{i,2}=h([f(m_i), \sigma_2])$ by anonymizing each feature vector using the predefined one-way function h modified by a second tracking-rights token $\sigma_2$, which second tracking-rights token is specific to a second group of at least one of the image sources and is distinct from the first tracking-rights token, wherein at least one image source belongs to both the first group and second group of the image sources; and
   disclose the first and second reidentification data items annotated with locations $X(m_i)$ of the respective subareas to tracking clients, while preventing access to the feature vectors;
   a plurality of tracking clients configured to perform reidentification of tracking targets using data obtained from the anonymization layer, including:
   a first tracking client, which is authorized to perform reidentification in fields-of-view of the first group of image sources and to acquire the location-annotated first reidentification data items; and
   a second tracking client, which is authorized to perform reidentification in fields-of-view of the second group of image sources and to acquire the location-annotated second reidentification data items; and
   wherein the anonymization layer is implemented in processing circuitry separate from the tracking clients.

2. The visual tracking system of claim 1, wherein the anonymization layer is implemented in processing circuitry of a coordinating entity in the visual tracking system and/or is implemented in processing circuitry which is co-located with respective ones of the image sources, wherein the coordinating entity is implemented in a dedicated server or host computer in a computer network, or as a process executing on a computer or a virtual machine with additional responsibilities in the visual tracking system.

3. A method of providing anonymized data for facilitating reidentification in a visual tracking system, the method comprising:
   detecting, in images M obtained from a plurality of image sources, subareas $m_i$ which each contain a tracking target;

computing, for each subarea, a feature vector $f(m_i)$ which represents a visual appearance of the tracking target therein;
   for a first group of the image sources;
   providing first reidentification data items $g_{i,1}=h([f(m_i), \sigma_1])$ by anonymizing each feature vector using a predefined one-way function h modified by a first tracking-rights token $\sigma_1$; and
   disclosing the first reidentification data items annotated with locations $X(m_i)$ of the respective subareas to a first tracking client;
   for a second group of the image sources;
   providing second reidentification data items $g_{i,2}=h([f(m_i), \sigma_2])$ by anonymizing each feature vector using the predefined one-way function h modified by a second tracking-rights token $\sigma_2$ which is distinct from the first tracking-rights token; and disclosing the second reidentification data items annotated with locations of the respective subareas to a second tracking client; and
   preventing access to the feature vectors,
   wherein the first tracking-rights token $\sigma_1$ is specific to a group of image sources that includes the first group, and the second tracking-rights token $\sigma_2$ is specific to a group of image sources that includes the second group, wherein the first and second groups of the image sources overlap at least partially; and
   wherein at least one image source belongs to both the first group and second group of the image sources.

4. The method of claim 3, further comprising:
   ceasing to use the first tracking-rights token $\sigma_1$ after expiry of a validity period thereof.

5. The method of claim 4, further comprising:
   performing a negotiation between a device performing the method and at least one further device which uses the first tracking-rights token $\sigma_1$ concerning the expiry of the validity period thereof, wherein the negotiation ends with a unanimous approval of a proposed expiry time.

6. The method of claim 4, further comprising:
   receiving an indication of the expiry of the validity period of the first tracking-rights token $\sigma_1$ decided by a coordinating entity in a visual tracking system,
   wherein the coordinating entity is implemented in a dedicated server or host computer in a computer network, or as a process executing on a computer or a virtual machine with additional responsibilities in the visual tracking system.

7. The method of claim 4, wherein, after the expiry of the validity period of the first tracking-rights token $\sigma_1$, the feature vectors for the first group of the image sources are anonymized using the predefined one-way function h modified by a substitute first tracking-rights token $\sigma_1'$.

8. The method of claim 3, wherein:
   the computation of the feature vectors $f(m_i)$ takes values in a discrete set; and/or
   the one-way function h used for providing the reidentification data items $g_{i,1}$, $g_{i,2}$ is proximity-preserving.

9. The method of claim 3, wherein the providing of the reidentification data items includes applying the tracking-rights tokens $\sigma_1$, $\sigma_2$ that modify the predefined one-way function as cryptographic salts.

10. The method of claim 3, wherein the tracking targets include a person and/or an inanimate object.

11. A method for performing visual tracking of tracking targets in fields-of-view of a first group of image sources, the method comprising:

at an anonymization layer in a visual tracking system, providing anonymized data by performing the method of claim 3; and, at a first tracking client in the visual tracking system, performing the following steps:

receiving the first reidentification data items $g_{i,1}$, each first reidentification data item annotated with the location of the respective subarea;

searching for matching reidentification data items among the first reidentification data items; and for a set of mutually matching reidentification data items, following one tracking target on the basis of the locations with which the mutually matching reidentification data items are annotated.

12. The method of claim 11, wherein said searching for matching reidentification data items is restricted in time to a validity period of the first tracking-rights token $\sigma_1$.

13. The method of claim 11, further comprising:

at a second tracking client in the visual tracking system, performing the following steps:

receiving the second reidentification data items, each second reidentification data item annotated with the location of the respective subarea;

searching for matching reidentification data items among the first reidentification data items; and for a set of mutually matching reidentification data items, following one tracking target on the basis of the locations with which the mutually matching reidentification data items are annotated.

14. The method of claim 12, further comprising:

at a second tracking client in the visual tracking system, performing the following steps:

receiving the second reidentification data items, each second reidentification data item annotated with the location of the respective subarea;

searching for matching reidentification data items among the first reidentification data items; and for a set of mutually matching reidentification data items, following one tracking target on the basis of the locations with which the mutually matching reidentification data items are annotated.

15. A device or device cluster comprising processing circuitry configured to perform the method of claim 3.

16. A non-transitory computer-readable storage medium comprising instructions which, when the instructions are executed by a computer, cause the computer to perform the method of claim 3.

\* \* \* \* \*